United States Patent
Krishna et al.

(10) Patent No.: US 10,089,097 B2
(45) Date of Patent: Oct. 2, 2018

(54) DYNAMIC TEMPLATES FOR VIRTUALIZED SYSTEMS

(71) Applicant: Extreme Networks, Inc., San Jose, CA (US)

(72) Inventors: Nishant Krishna, Bihar (IN); Seetharam V Rao, Karnataka (IN); Kalaiyarasan Periasamy, Tamil Nadu (IN); Navaneethan Marichetty, Hosur (IN)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 14/872,073

(22) Filed: Sep. 30, 2015

(65) Prior Publication Data

US 2017/0075712 A1  Mar. 16, 2017

Related U.S. Application Data

(60) Provisional application No. 62/217,940, filed on Sep. 13, 2015.

(51) Int. Cl.
*G06F 8/61* (2018.01)
*G06F 9/455* (2018.01)

(52) U.S. Cl.
CPC ............ *G06F 8/61* (2013.01); *G06F 9/45558* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,099,391 B1 * | 1/2012 | Monckton | G06F 11/1451 707/647 |
| 8,495,097 B1 | 7/2013 | Ayers | |
| 2003/0033597 A1 * | 2/2003 | Allsop | G06F 8/61 717/169 |
| 2004/0015938 A1 * | 1/2004 | Taylor | G06F 8/65 717/168 |

(Continued)

OTHER PUBLICATIONS

Fernandez et al., "Two patterns for cloud computing: secure virtual machine image repository and cloud policy management point" (Oct. 23-26, 2013), Proceedings of the 20th Conference on Pattern Languages of Programs, pp. 1-11 [retrieved from http://dl.acm.org/citation.cfm?id=2725687].*

(Continued)

*Primary Examiner* — Brian W Wathen
(74) *Attorney, Agent, or Firm* — Haley Guiliano LLP

(57) ABSTRACT

Methods, systems and computer readable media for dynamic templates for virtualized systems are described. A method for initially deploying a virtualized can include receiving a selection indicating a dynamic template, and installing a base configuration using base configuration information obtained from the dynamic template. The method can also include traversing a hierarchy within the dynamic template and installing one or more sub-level configurations according to the hierarchy. The method can further include stopping the traversing and installing when a termination condition is reached.

20 Claims, 7 Drawing Sheets

(56) References Cited

U.S. PATENT DOCUMENTS

| | | | |
|---|---|---|---|
| 2005/0188258 A1* | 8/2005 | Zweifel | G06F 8/65 714/23 |
| 2010/0306337 A1* | 12/2010 | DeHaan | G06F 8/63 709/213 |
| 2012/0215998 A1* | 8/2012 | Sharp | G06F 3/061 711/162 |
| 2012/0324446 A1* | 12/2012 | Fries | G06F 21/64 718/1 |
| 2013/0152079 A1* | 6/2013 | Heyman | G06F 9/45558 718/1 |
| 2013/0232498 A1* | 9/2013 | Mangtani | G06F 9/5072 718/104 |
| 2013/0332610 A1* | 12/2013 | Beveridge | G06F 9/4445 709/226 |
| 2015/0178107 A1* | 6/2015 | Gummaraju | G06F 9/45558 718/1 |
| 2015/0213106 A1* | 7/2015 | Kunde | G06F 17/30589 718/1 |
| 2015/0355900 A1* | 12/2015 | Crosby | G06F 3/0679 717/168 |
| 2015/0378700 A1* | 12/2015 | Rachamadugu | G06F 8/60 717/120 |
| 2016/0041837 A1* | 2/2016 | Rangayya | G06F 9/45558 718/1 |
| 2016/0124764 A1* | 5/2016 | Nithrakashyap | G06F 3/0619 718/1 |

OTHER PUBLICATIONS

Steve Jin, "VMware vCloud Air Blog", https://blogs.vmware.com/vcloud/2011/01/cloud-architecture-patterns-vm-template.html, Jan. 24, 2011.

* cited by examiner

300

DYNAMIC TEMPLATES FOR VIRTUALIZED SYSTEMS

RELATED APPLICATIONS

This application claims the benefit of U.S. Provisional Application No. 62/217,940, entitled "Dynamic Templates for Virtualized Systems" filed on Sep. 13, 2015, which is incorporated herein by reference in its entirety.

TECHNICAL FIELD

Embodiments relate generally to computer networks, and more particularly, to methods, systems and computer readable media for dynamic templates for virtualized systems.

BACKGROUND

There may be inefficiencies in some conventional methods of creating/building, deploying and managing templates for cloud-based virtualized systems. These templates may need to be complete in terms of the products and tenants the templates are supporting. This may lead to inefficiencies in terms of extra effort from a development team to replicate the same content through the templates, a relatively large amount of storage space may be required to store the conventional templates, and updating conventional stack templates or fixing a security vulnerability may require editing all of the templates which form the stack. Further, moving to an older stack template may potentially involve re-deploying an entire stack template.

Also, some conventional methods of creating, deploying and managing templates may be inefficient in handling multiple products from the same company. Moreover, conventional methods may not address the case of multi-tenant environment.

The above-mentioned inefficiencies can lead to a minimal reuse of existing templates and utilization of increased storage space. For example, if an administrator seeks to perform a system recovery (or go back to an earlier template), a full set of templates for the turnkey solution system may be required. Moreover, the administrator may have to keep the templates up-to-date with the modified data which is often a manual operation and may take up a large amount (e.g., thousands) of hours of work in a large datacenter environment.

Embodiments were conceived in light of the above mentioned needs, problems and/or limitations, among other things.

SUMMARY

One or more embodiments can include methods, systems and computer readable media for dynamic templates for virtualized systems. A method to deploy a virtualized system can include receiving a selection indicating a dynamic template having base configuration information and one or more sub-level configurations in a hierarchy, and installing a base configuration using base configuration information obtained from the dynamic template. The method can also include traversing a hierarchy within the dynamic template and installing one or more sub-level configurations according to the hierarchy. The method can further include stopping the traversing and installing when a termination condition is reached.

In some implementations, the selection indicating the dynamic template can include an indication of one or more locations within the dynamic template, each location corresponding to a specific configuration of a given virtual element associated with that location. The method can also include generating a fingerprint corresponding to the selection indicating the dynamic template and the one or more locations within the dynamic template. The method can further include authenticating a user according to a Role Based Access Control (RBAC) policy configured to permit the user to access a subset of the template perform operations corresponding to permissions established within the RBAC for the user. Some implementations can include a method for updating a virtualized system. The method can include receiving a selection indicating a dynamic template, and determining a current configuration of the virtualized system. The method can also include navigating to a level of the dynamic template based on the current configuration. The method can further include traversing a hierarchy within the dynamic template and installing one or more sub-level configurations according to the hierarchy. The method can also include stopping the traversing and installing when a termination condition is reached.

The selection indicating the dynamic template can include an indication of one or more locations within the dynamic template, each location corresponding to a specific configuration of a given virtual element associated with that location. The method can also include generating a fingerprint corresponding to the selection indicating the dynamic template and the one or more locations within the dynamic template. The method can further include authenticating a user according to a Role Based Access Control (RBAC) policy configured to permit the user to access a subset of the template perform operations corresponding to permissions established within the RBAC for the user. Some implementations can include a method for cloning a virtualized system. The method can include receiving a selection indicating a dynamic template associated with a first virtualized system to be used to deploy a clone of the first virtualized system at a second virtualized system. The method can also include installing, at the second virtualized system, a base configuration using base configuration information obtained from the dynamic template. The method can further include traversing a hierarchy within the dynamic template and installing, at the second virtualized system, one or more sub-level configurations according to the hierarchy. The method can also include stopping the traversing and installing when a termination condition is reached.

Some implementations can include a method for migrating a virtualized system. The method can include receiving a selection indicating a first virtualized system to be migrated and a second virtualized system location to which to migrate the first virtualized system, and installing, at the second virtualized system location, a base configuration using base configuration information obtained from the dynamic template. The method can also include traversing a hierarchy within the dynamic template and installing, at the second virtualized system location, one or more sub-level configurations according to the hierarchy. The method can further include stopping the traversing and installing when a termination condition is reached.

Some implementations can include a system comprising one or more processors coupled to a nontransitory computer readable medium having stored thereon on software instructions that, when executed by the one or more processors, cause the one or more processors to receive a selection indicating a dynamic template, and install a base configuration using base configuration information obtained from the dynamic template. The instructions can also cause the one or more processors to traverse a hierarchy within the dynamic template and install one or more sub-level configurations according to the hierarchy, determine that a termination condition is reached, and in response to the determination, stop the traversal and installation.

The selection indicating the dynamic template can include an indication of one or more locations within the dynamic template, each location corresponding to a specific configuration of a given virtual element associated with that location. The software instructions can also be configured to cause the one or more processors to generate a fingerprint corresponding to the selection indicating the dynamic template and the one or more locations within the dynamic template. The software instructions can be further configured to cause the one or more processors to authenticate a user according to a Role Based Access Control (RBAC) policy configured to permit the user to access a subset of the template perform operations corresponding to permissions established within the RBAC for the user.

Some implementations can include a system comprising one or more processors coupled to a nontransitory computer readable medium having stored thereon on software instructions that, when executed by the one or more processors, cause the one or more processors to receive a selection indicating a dynamic template, and determine a current configuration of the virtualized system. The instructions can also cause the one or more processors to navigate to a level of the dynamic template based on the current configuration, and to traverse a hierarchy within the dynamic template and installing one or more sub-level configurations according to the hierarchy. The software instructions can further cause the one or more processors to stop the traversing and installing when a termination condition is reached.

The selection indicating the dynamic template can include an indication of one or more locations within the dynamic template, each location corresponding to a specific configuration of a given virtual element associated with that location. The software instructions can also be configured to cause the one or more processors to generate a fingerprint corresponding to the selection indicating the dynamic template and the one or more locations within the dynamic template. The software instructions can be further configured to cause the one or more processors to authenticate a user according to a Role Based Access Control (RBAC) system configured to permit the user to access a subset of the template perform operations corresponding to permissions established within the RBAC for the user.

Some implementations can include a system comprising one or more processors coupled to a nontransitory computer readable medium having stored thereon on software instructions that, when executed by the one or more processors, cause the one or more processors to receive a selection indicating a dynamic template associated with a first virtualized system to be used to deploy a clone of the first virtualized system at a second virtualized system. The software instructions can also cause the processor to install, at the second virtualized system, a base configuration using base configuration information obtained from the dynamic template, and traverse a hierarchy within the dynamic template and installing, at the second virtualized system, one or more sub-level configurations according to the hierarchy. The software instructions can further cause the processor to stop the traversing and installing when a termination condition is reached.

Some implementations can include a system comprising one or more processors coupled to a nontransitory computer readable medium having stored thereon on software instructions that, when executed by the one or more processors, cause the one or more processors to receive a selection indicating a first virtualized system to be migrated and a second virtualized system location to which to migrate the first virtualized system, and install, at the second virtualized system location, a base configuration using base configuration information obtained from the dynamic template. The software instructions can also cause the one or more processors to traverse a hierarchy within the dynamic template and installing, at the second virtualized system location, one or more sub-level configurations according to the hierarchy, and to stop the traversing and installing when a termination condition is reached.

Some implementations can include a nontransitory computer readable medium having stored thereon software instructions that, when executed by one or more processors, cause the processors to receive a selection indicating a dynamic template, and install a base configuration using base configuration information obtained from the dynamic template. The software instructions can also cause the one or more processors to traverse a hierarchy within the dynamic template and installing one or more sub-level configurations according to the hierarchy, determine that a termination condition is reached, and in response to the determination, stop the traversal and installation.

The selection indicating the dynamic template can include an indication of one or more locations within the dynamic template, each location corresponding to a specific configuration of a given virtual element associated with that location. The software instructions can also be configured to cause the one or more processors to generate a fingerprint corresponding to the selection indicating the dynamic template and the one or more locations within the dynamic template. The software instructions can be further configured to cause the one or more processors to authenticate a user according to a Role Based Access Control (RBAC) system configured to permit the user to access a subset of the template perform operations corresponding to permissions established within the RBAC for the user.

Some implementations can include a nontransitory computer readable medium having stored thereon software instructions that, when executed by one or more processors, cause the processors to receive a selection indicating a dynamic template, and to determine a current configuration of the virtualized system. The software instructions can also cause the processor to navigate to a level of the dynamic template based on the current configuration, and to traverse a hierarchy within the dynamic template and installing one or more sub-level configurations according to the hierarchy. The software instructions can further cause the processor to stop the traversing and installing when a termination condition is reached.

The selection indicating the dynamic template can include an indication of one or more locations within the dynamic template, each location corresponding to a specific configuration of a given virtual element associated with that location. The software instructions can be further configured to cause the one or more processors to generate a fingerprint corresponding to the selection indicating the dynamic template and the one or more locations within the dynamic template. The software instructions can be further configured to cause the one or more processors to authenticate a user according to a Role Based Access Control (RBAC) system configured to permit the user to access a subset of the template perform operations corresponding to permissions established within the RBAC for the user.

Some implementations can include a nontransitory computer readable medium having stored thereon software instructions that, when executed by one or more processors, cause the processors to receive a selection indicating a dynamic template associated with a first virtualized system to be used to deploy a clone of the first virtualized system at a second virtualized system, and install, at the second virtualized system, a base configuration using base configuration information obtained from the dynamic template. The software instructions can also be configured to cause the processor to traverse a hierarchy within the dynamic template and installing, at the second virtualized system, one or more sub-level configurations according to the hierarchy, and stop the traversing and installing when a termination condition is reached.

Some implementations can include a nontransitory computer readable medium having stored thereon software instructions that, when executed by one or more processors, cause the processors to receive a selection indicating a first virtualized system to be migrated and a second virtualized system location to which to migrate the first virtualized system, and install, at the second virtualized system location, a base configuration using base configuration information obtained from the dynamic template. The software instructions can also cause the processor to traverse a hierarchy within the dynamic template and installing, at the second virtualized system location, one or more sub-level configurations according to the hierarchy, and to stop the traversing and installing when a termination condition is reached.

In any of the above implementations, the fingerprint can be an incremental fingerprint including one or more portions corresponding to one or more changes to the dynamic template. In any of the above implementations, the incremental fingerprint can be processed to determine a template location. In any of the above implementations, the dynamic template and one or more locations within the template can be processed to generate an incremental fingerprint.

DETAILED DESCRIPTION

Figure 1:
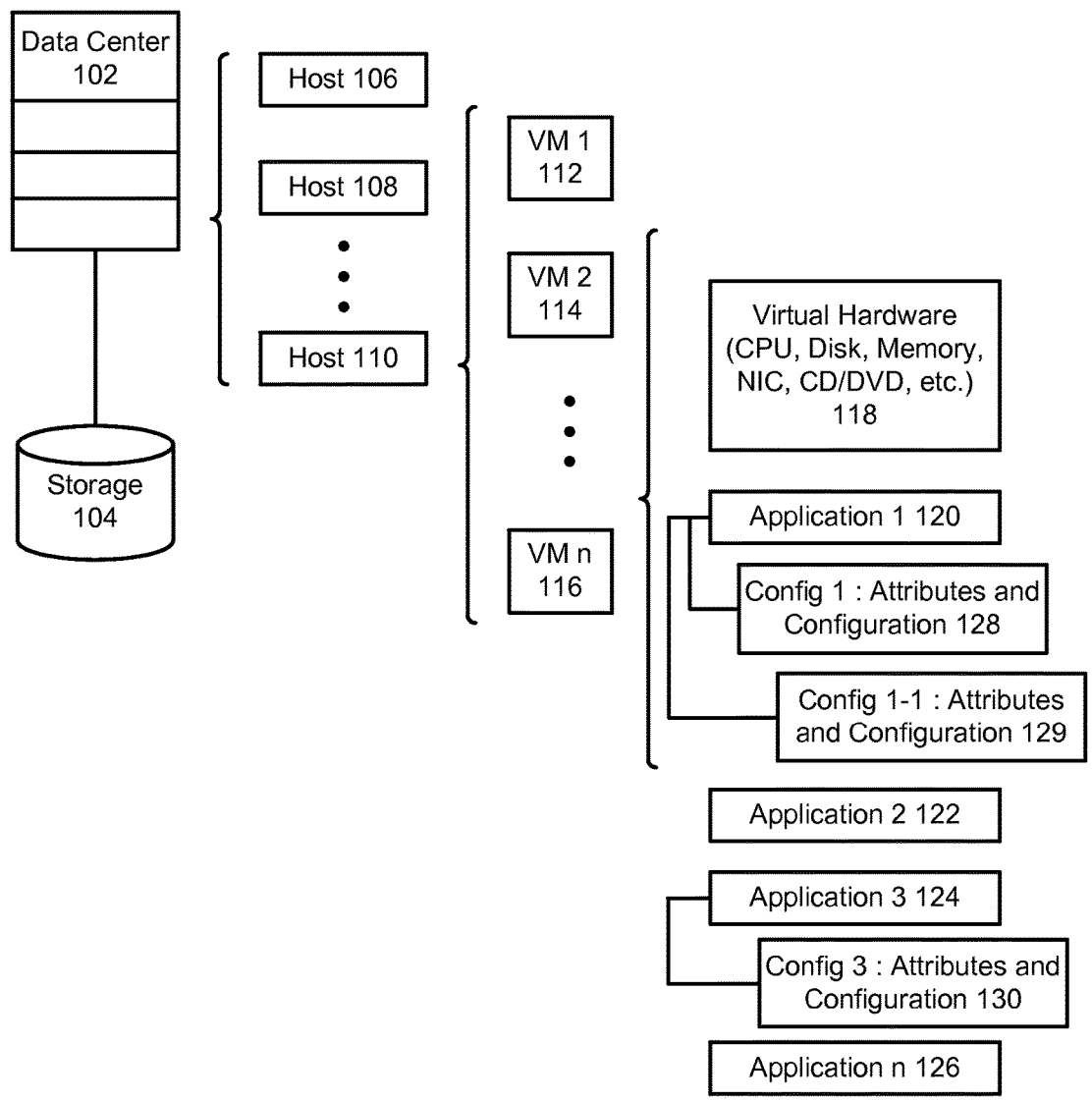
FIG. 1 is a diagram of an example virtualized system environment in accordance with at least one implementation.

In general, some implementations can include a dynamic multi-product stack template that an administrator (e.g., a cloud administrator or a tenant administrator) would use to deploy an instance of the stack from the template and optionally customize the instance based on one or more business needs or requirements. Some implementations can include a built-in hierarchy system and associated metadata. A user can deploy a template from any selected location within a hierarchy. Some implementations of a dynamic template system can include an ability to install, update or configure systems (e.g., turnkey systems) having applications from a number of different companies (e.g., from Avaya and one or more partners of Avaya or other companies). The dynamic template system described herein is not limited to products from a single company or vendor, but can be configured to handle multiple different products from multiple respective companies. In such instances, the dynamic template system may first deploy a base configuration followed by any delta configuration in the hierarchy until the system reaches a termination condition (e.g., reaches a leaf node in the template hierarchy data structure). A dynamic template hierarchy can include any suitable structure, such as a b-tree structure, in which case the b-tree operations could be used to traverse the dynamic template and indexing would be relatively simple, which could accommodate datacenters having many (e.g., thousands) of such configurations.

The dynamic template hierarchy can be automatically built as and when templates are updated or new virtual machines (VMs) are deployed over an existing template. The metadata of a child can be appended as leaf node of its parent and hence the hierarchy can be built over time. A template can have one or more sub-templates, which may be generated whenever a change to a template is applied.

Some implementations can provide the ability to quickly backout/rollback to any level above the current level or any other configuration at the same level. This feature can be accomplished by a bi-directional traversal of a dynamic template hierarchy from parent to child or from child to parent. So, no matter where a particular system is within a hierarchy, an administrator can quickly go back and forth between levels and then perform a backout/rollback with relative ease compared to conventional techniques.

Some implementations can provide an ability to create/export a template from any point in a dynamic template hierarchy. While exporting the template, all the layers above the selected export point can be aggregated (or merged) into the new/exported template. This feature can also be supported by the ability to do bi-directional traversals of a hierarchical template (e.g., structured as a b-tree) from parent to child or from child to parent. So, no matter what location a configuration is within a template, an administrator can quickly go back and forth and then create/export a new/exported template. When a template is created from a specific location within the hierarchy, all the changes in the hierarchy above it are merged to the resulting template making it a consolidated template.

In some implementations, a timeline can be created and maintained to apply changes from one VM of a template to another VM of the same template. The system can also create a timeline of template changes including the external entities for a cluster. For example, some implementations can save the network configuration along with the state of a VM. Further, some implementations can include saving internal network configuration information (e.g., done inside the OS) and/or external configuration information including external dependencies and network policies. This can be utilized to perform a restore which brings an entire system back to a given state (e.g., an original state). Moreover, when replicating the system, some implementations provide an ability to have all system information replicated, not just applications and their respective states.

Some implementations can keep track of incremental changes at the template level and then can apply them in real time or in bulk to the template.

Some implementations can include a fingerprinting (or signature) feature for templates. The system can use a fingerprint (e.g., an incremental hash value) to recognize which VMs from among a group of VMs have the nearest fingerprint to a given VM and can use a similar template to bring the given VM (or one or more of the similar VMs) to the same level (or state) of VM configuration using a similar template. Some implementations can include creating or reconstituting a fingerprint in such a way that it is possible to go from one location in the hierarchy to another and adding to the fingerprint and/or removing from the fingerprint to arrive at a desired predictable fingerprint. In other words, a fingerprint can be used to recreate a template (or portion of a template) corresponding to that fingerprint, or selecting one or more locations within a template can be used to recreate a fingerprint corresponding to the one or more template locations.

Fingerprinting can be performed using well-known methods (e.g., incremental hash). However, implementations may utilize the fingerprint in a manner that may be different from conventional templates. For example, all VMs created from the same template may have the same fingerprint. The fingerprint may not change until a change is applied to the VM corresponding to the fingerprint, which can make it incompatible with the template it originated from. One such example is application of a kernel patch or an operating system (OS) patch.

Some implementations of the dynamic template system described herein can apply changes from one VM of a template to another VM of the same template. This can then be extended to apply the changes across different datacenters.

While dynamically enhancing the template, an implementation can ensure that the template is still valid for the corresponding virtualized system and that system integrity is maintained. For example, this can be done by providing hooks to inject validation/checking scripts which can identify the status of a system. In some implementations, resulting templates can include a self-check portion embedded into the template while the template is being created. The self-check feature can be used to help ensure the integrity of the template. These hooks can be implemented using software interfaces (e.g., Java interfaces), which can automatically integrate with the validation/checking scripts found in the class path. Another way the hooks can be implemented is by placing the validation/checking scripts in a specific folder and causing a master script to automatically detect the presence of these scripts and executing them in a given order (e.g., alphabetical order). If a dynamic template doesn't pass one or more test(s) of validation checking script, the template may be discarded and another instance can be created.

As mentioned above, some implementations can include metadata along with functionality to act on the metadata. This metadata may be defined beforehand for each template and any sub-templates deriving from it. This can effectively result in self-contained virtual bundles for templates, which can remain virtual and dynamic. Templates need not have content merged into a single template until they are being deployed, at which time the merging operation can be performed dynamically by the system.

In a cloud deployment model, a dynamic stack template system could help simplify deployments. For example, a system administrator (e.g., cloud administrator or tenant administrator) could deploy an instance of the stack from the dynamic template system and customize the deployment based on one or more business needs.

In some implementations, the system can automatically learn how stack templates are being used such that at a time in the future, the user may not have to repeat the process of deployment and configuration if there is not a change from the initial process when a stack template was first created. The original template can contain information automatically collected about what the template instances are and how these instances are being used.

Both of the above mentioned concepts could be implemented by adding a callback function to each of the templates. The callback function serves to notify an immediate parent about any changes. These changes can be saved as one or more "delta configurations". The same "delta configurations" can also be created whenever a sub-template is applied on top of a template. The delta configuration can also contain fingerprinting data as discussed above.

FIG. 1 is a diagram of an example virtualized system environment 100 in accordance with at least one implementation. The environment 100 includes a datacenter 102 and associated data storage 104. The datacenter 102 in a virtualized system (e.g., a VMware™ system) can include multiple hosts (106-110). Each host (106-110) can have multiple virtual machines (112-116). Each of the virtual machines (112-116) can include virtual hardware 118 and can run multiple virtual applications (120-126). Each virtual application (or set of virtual applications) (120, 122, 124 and/or 126) can have application-specific attributes and configurations. For example, Application 1 (120) can include a sub-level of attributes and configuration information Config 1 (128), which may be specific to Application 1 (122). Some implementations can also include sub-levels of attribute and configuration information. For example Config 1 (128) has a sub-level Config 1-1 (129), which includes delta attribute and/or configuration information for Config 1 (128). In another example, Application 3 (124) includes a sub-level of attribute and configuration information Config 3 (130), which may be specific to Application 3 (124).

Figure 2:
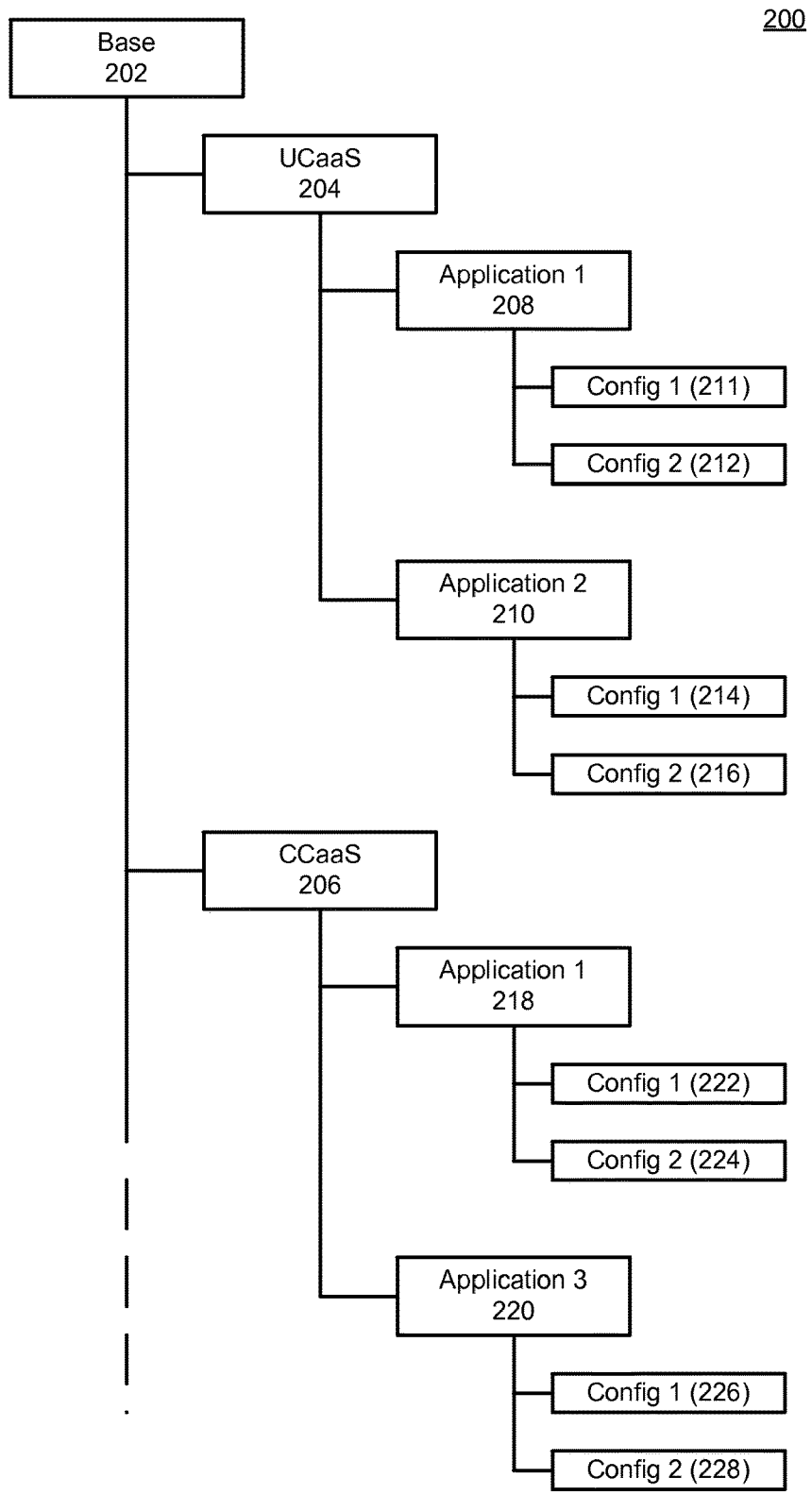
FIG. 2 is a diagram of an example dynamic template hierarchy corresponding to a virtualized system in accordance with at least one implementation.

FIG. 2 is a diagram of an example dynamic template hierarchy 200 corresponding to a virtualized system in accordance with at least one implementation. The hierarchy 200 includes a base level 202, which can be common to multiple products or systems. Below the base level 202, the hierarchy can include one or more next levels (e.g., corresponding to service types), in this example Unified Communications as a Service (UCaaS) 204 and Contact Center as a Service (CCaaS) 206.

Within the UCaaS 204 sub-tree, there are one or more application levels (208/210) and configurations for each application. For example, configurations 211/212 for Application 1 208, and configurations 214/216 for Application 2 210.

Within the CCaaS 206 sub-tree, there are one or more application levels (218/220) and configurations for each application. For example, configurations 222/224 for Application 1 218, and configurations 226/228 for Application 2 220.

In operation, Application 1 208 configuration(s) (210 and/or 212) can be applied to the UCaaS 204 configuration from which it descends. The application configurations (e.g., 211-216 and/or 222-228) can include multiple possible configurations which can be applied to a corresponding base application configuration (e.g., 208, 210, 218, 220) to create a new product template.

In some implementations, at each level, data can be kept and applied to the configuration above it. The data can include instructions to deploy, un-deploy, start, and/or stop the applications including sequence of deployment and dependency resolution instructions. The data can also include information about the network associated with the applications of the stack, and post application/stack deployment procedures. The data can further include validation/checking scripts to determine whether the configuration is applied properly. The data can also include information about the parent template on which the configuration can be applied.

Delta (or change) information can be kept at each of the levels (e.g., 211-216 and 222-228) and can be used to apply incremental changes in order to create a consolidated template. Maintaining delta information can also provide an ability to show a timeline of template changes on a user interface.

Figure 3:
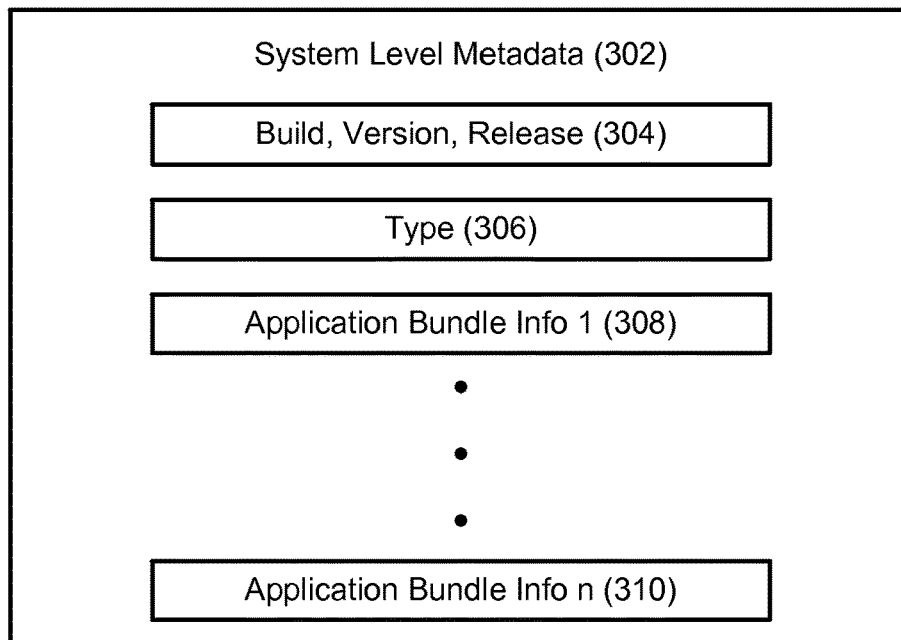
FIG. 3 is a diagram of example dynamic template metadata in accordance with at least one implementation.
Figure 3:
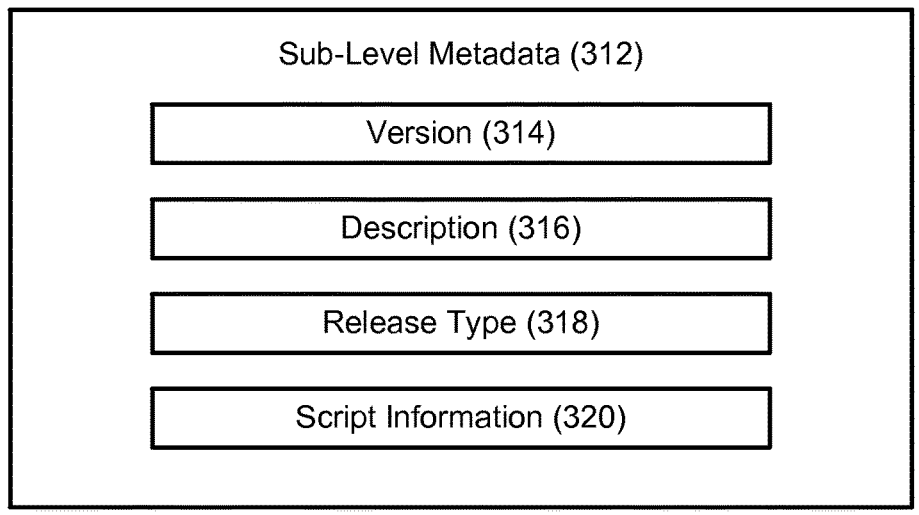

FIG. 3 is a diagram of example dynamic template metadata 300 in accordance with at least one implementation. Dynamic template metadata 300 can include system level metadata 302 and sub-level metadata 312.

The system level metadata 302 can include build, version and release data 304. For example, data 304 can include a build number, build description, version, and release date. The system level metadata 302 can also include a release type value 306, which can indicate a type of release such as update, patch, sub-template configuration, etc.

The system level metadata 302 can also include one or more application bundle info elements 308-310. The application bundle information elements 308-310 can each include information such as install order, information about what systems/applications the bundle is applicable for, an application name and an app bundle file name. The app bundle file can include information such as name, description and relative path.

The sub-level metadata 312 can include information such as version 314, description 316, release type 318 (e.g., update, patch, sub-template configuration, etc.), release date and script information 320. The script information 320 can include information about one or more of an install script, a pre install script, a post install script, and a log file location.

Figure 4:
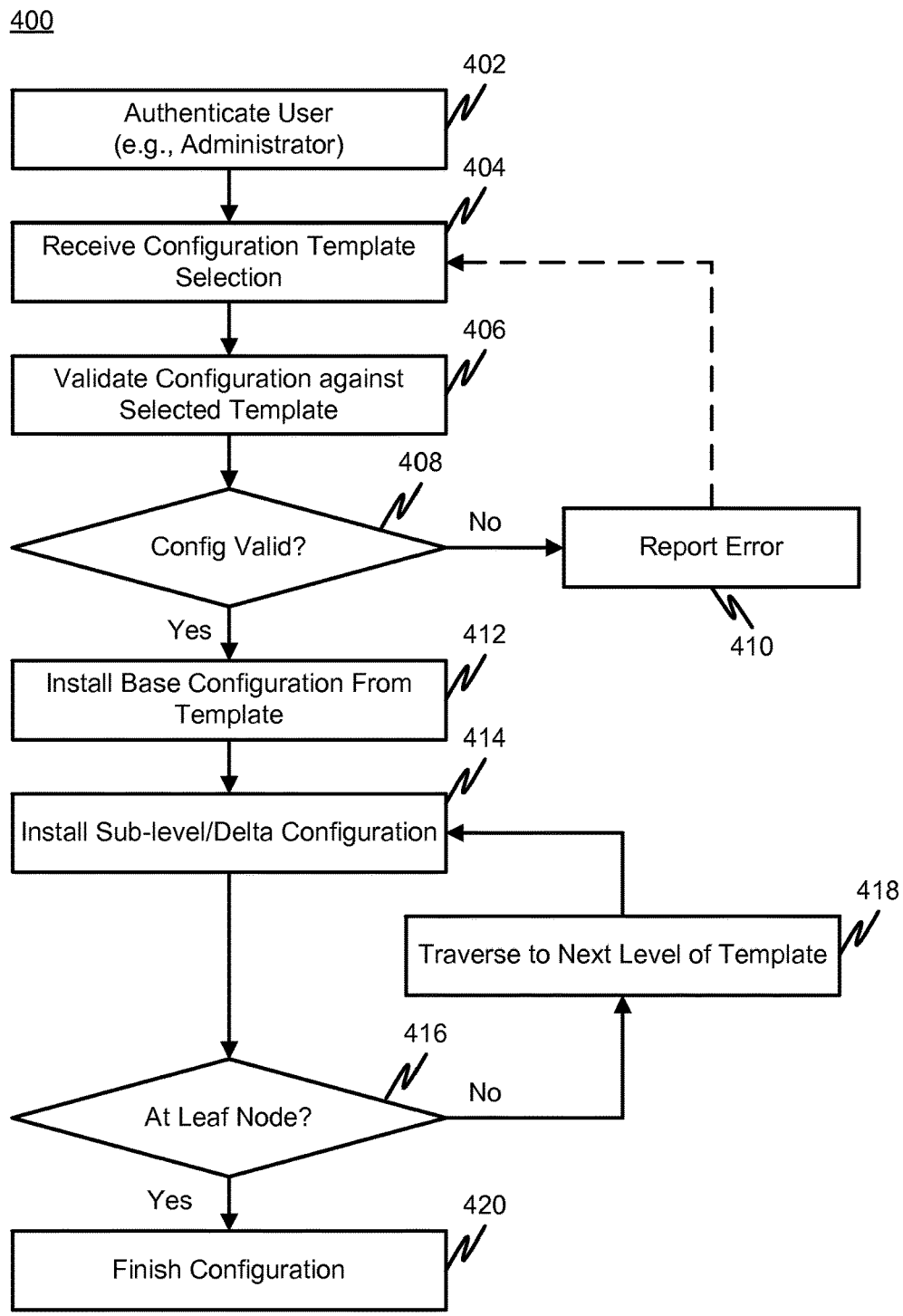
FIG. 4 is a flow chart of an example method of an initial virtualized system configuration process using a dynamic template in accordance with at least one implementation.

FIG. 4 is a flow chart of an example method 400 of an initial virtualized system configuration process using a dynamic template in accordance with at least one implementation. Processing for the method 400 begins at 402, where a user (e.g., a cloud administrator, tenant administrator, etc.) is authenticated to a system including the dynamic template system. In some implementations, the user could be a system or process running with user privileges, in which case the selection may be received through an application programming interface (API) or other similar interface. In addition to basic administrator authentication, an implementation can include Role Based Access Control (RBAC), which can be configured to control access to one or more subsets of a dynamic template hierarchy and give various other permissions (e.g., view, create, edit or delete) to one or more authorized users based on the role of the user. Processing continues to 404.

At 404, a dynamic template selection is received. For example, the user may select a dynamic template or a specific configuration location within a dynamic template hierarchy via text entry or via a graphical user interface or the like. Processing continues to 406.

At 406, the selected template is validated against a target system (e.g., a stack, a VM, etc.) to determine if the selected template is suitable for use in configuring the target system. The target system can be selected by the user in a manner similar to that in which the dynamic template is selected. Processing continues to 408.

At 408, it is determined whether the selected configuration is valid for use with the target configuration. For example, if the selected template includes configuration information for an application, virtual machine, virtual hardware, etc. that is not available on the target system, then the selected template may not be valid. If the selected template is not valid, processing continues to 410. If the selected template is valid, processing continues to 412.

At 410, an error is reported (e.g., an error message is caused to be displayed for the user to view). Processing continues to 404, where the user may select another template.

At 412, the base configuration is installed from the selected template. For example, the base configuration may include level 202 shown in FIG. 2. Processing continues to 414.

At 414, a sub-level or delta configuration is installed. For example, the UCaaS level 204 configuration may be installed for a deployment including UCaaS. Processing continues to 416.

At 416, it is determined whether the current node is a leaf node. For example, if the current node was the application 1 208 node, it would not be a leaf node. However, if the current node was configuration 2 212, then the system would be at a leaf node. If the current node is not a leaf node, processing continues to 416. If the current node is a leaf node, processing continues to 420 where the configuration is finished for this template (or section of the template). In this manner, reaching a leaf node may be a termination condition for method 400. Some implementations may include one or more other termination conditions such as reaching an error count, reaching an invalid level in a template hierarchy, and reaching an element in the template that indicates the element is a termination point.

At 418, a next level of the hierarchy of the selected template is traversed to. For example, from the UCaaS 204 level reached at 414, the system may traverse to the Application 1 (208) level. Processing continues to 414.

Figure 5:
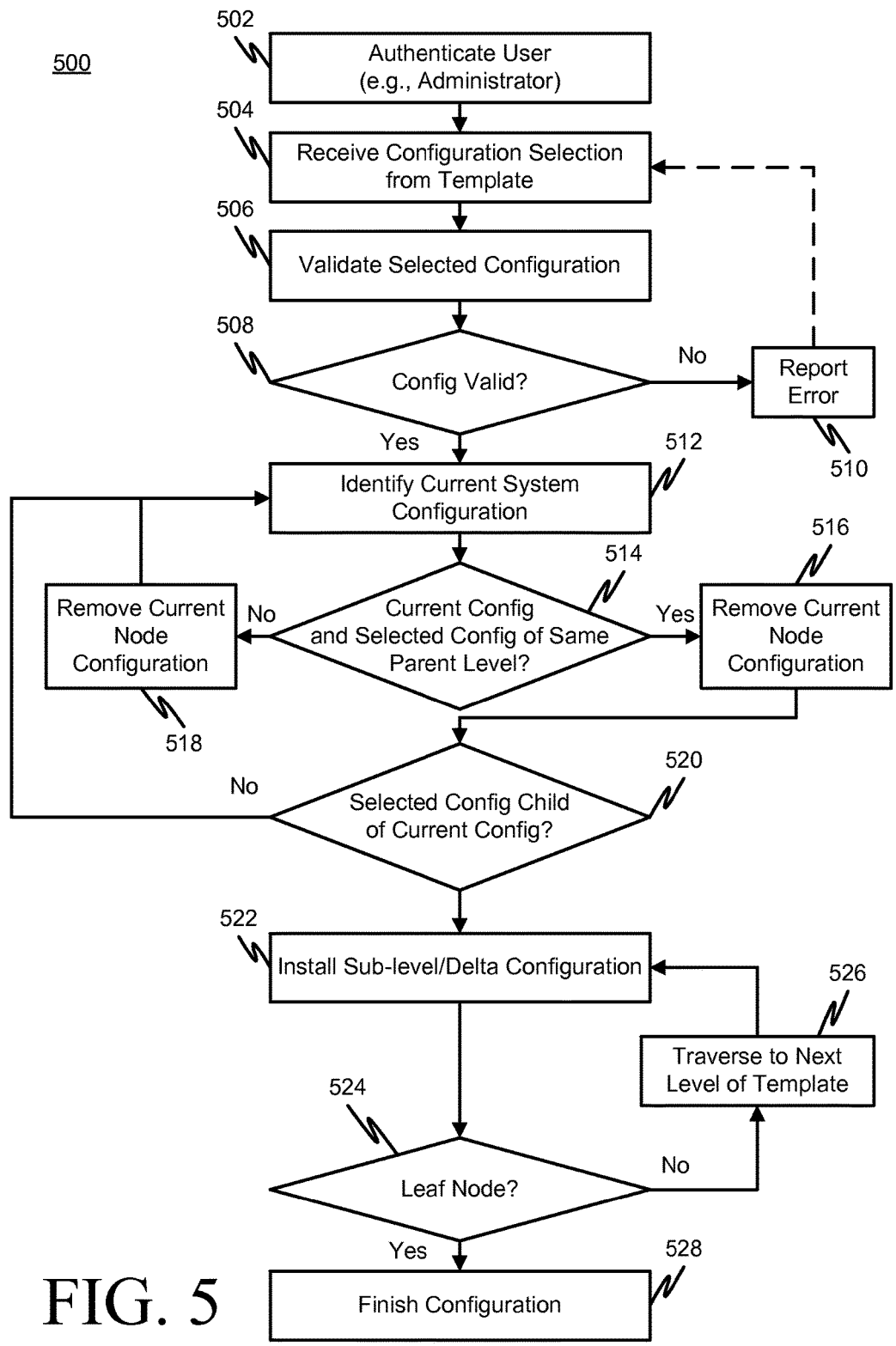
FIG. 5 is a flow chart of an example method of a virtualized system configuration update process using a dynamic template in accordance with at least one implementation.

FIG. 5 is a flow chart of an example method 500 of a virtualized system configuration update process using a dynamic template in accordance with at least one implementation. The system configuration update process can be triggered based on one or more changes to a dynamic template and the changes to the dynamic template may be determined based on an incremental fingerprint of the dynamic template and one or more locations within the dynamic template. Processing for the method 500 begins at 502, where a user (e.g., a cloud administrator, tenant administrator, etc.) is authenticated to a system including the dynamic template system. Processing continues to 504.

At 504, a dynamic template selection is received. For example, the user may select a dynamic template or a specific configuration location within a dynamic template hierarchy via text entry or via a graphical user interface or the like. Processing continues to 506.

At 506, the selected template is validated against a target system (e.g., a stack, a VM, etc.) to determine if the selected template is suitable for use in configuring the target system. The target system can be selected by the user in a manner similar to that in which the dynamic template is selected. Processing continues to 508.

At 508, it is determined whether the selected configuration is valid for use with the target configuration. For example, if the selected template includes configuration information for an application, virtual machine, virtual hardware, etc. that is not available on the target system, then the selected template may not be valid. If the selected template is not valid, processing continues to 510. If the selected template is valid, processing continues to 512.

At 510, an error is reported (e.g., an error message is caused to be displayed for the user to view). Processing continues to 504, where the user may select another template.

At 512, the current system configuration is identified. For example, the current system configuration can include information representing the configuration (e.g., version, patch level, configuration parameters, etc.) of one or more of a host, a VM, a virtual hardware device and/or an application. Processing continues to 514.

At 514, it is determined whether the current configuration and selected template configuration are of a same parent level in the selected template hierarchy. If so, processing continues to 516. If not, processing continues to 518.

At 516, the current node configuration is removed. For example, an uninstall script is executed for the current node configuration. Processing continues to 520.

At 518, the current node configuration is removed. For example, an uninstall script is executed for the current node configuration. Processing continues to 512.

At 520, it is determined whether the selected configuration is a child of the current configuration. If so, processing continues to 522. If not, processing continues to 512.

At 522, a sub-level or delta configuration is installed. For example, the UCaaS level 204 configuration may be installed for a deployment including UCaaS. Processing continues to 524.

At 524, it is determined whether the current node is a leaf node. For example, if the current node was the application 1 208 node, it would not be a leaf node. However, if the current node was configuration 2 212, then the system would be at a leaf node. If the current node is not a leaf node, processing continues back to 526. If the current node is a leaf node, processing continues to 528 where the configuration is finished for this template (or section of a template). In this manner, reaching a leaf node may be a termination condition for method 500.

At 526, a next level of the hierarchy is traversed to. For example, from the UCaaS 204 level reached at 522, the system may traverse to the Application 1 208 level. Processing continues to 522.

Steps 514-520 serve to essentially carry out a tree traversal to identify the right level from which to start appending the "updated configuration". By traversing the tree in an upward manner, a system can traverse to a suitable parent node from which to start applying configuration updates, without having to perform a complete installation from the base template. The number of tree traversals may depend on the distance between a current configuration of a virtualized system and a selected dynamic template and one or more location within the dynamic template.

Figure 6:
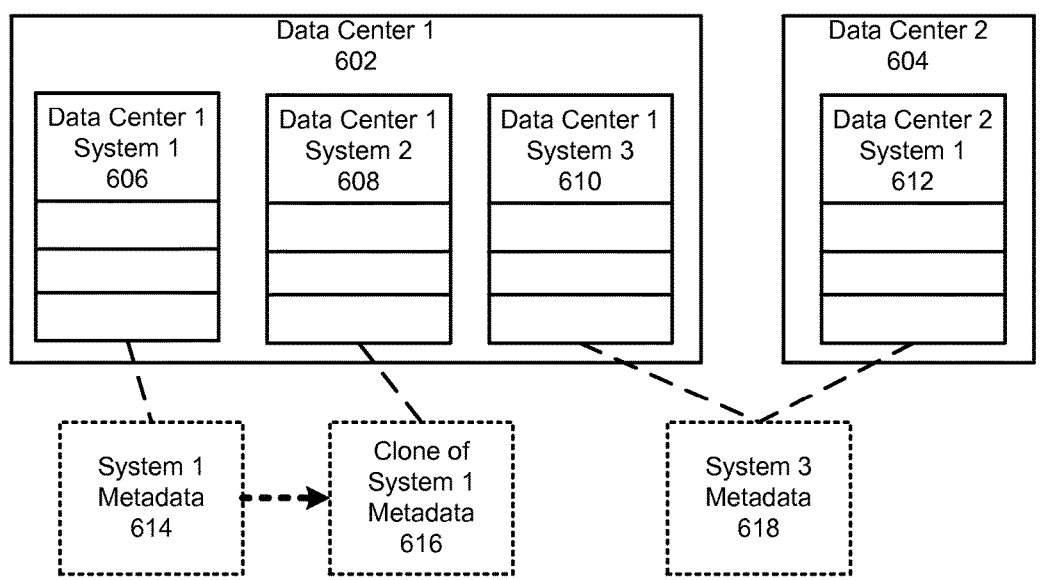
FIG. 6 is a diagram of example cloning and migrating using dynamic template metadata in accordance with at least one implementation.

FIG. 6 is a diagram of example cloning and migrating using dynamic template metadata in accordance with at least one implementation. In an example cloning process, a stack from System 1 (606) in Data Center 1 (602) is to be cloned in System 2 (608) of Data Center 1 (602).

Cloning proceeds by obtaining metadata for System 1 614, making a copy of this metadata for System 2 616, and installing a base template for the stack of System 2 from the copied metadata 616. Then, the dynamic template system can recursively install delta sub-template configurations until the System 2 reaches the same configuration as the source. An audit can be performed to ensure the cloning process has occurred without errors. The dynamic template system can maintain information indicating that System 2 has been cloned from the template of System 1 and automatically apply any incremental changes from the template of System 1 to the template of System 2 to dynamically enhance the template at Datacenter 1.

In an example migration process, System 3 (610) of Data Center 1 (602) is to be migrated to System 1 (612) of Data Center 2 (604). Migration proceeds by installing a base template for the stack of System 3 based on the metadata 618 for System 3 (610). Delta sub-template configurations (e.g., only the required ones) are sent to the remote data center. The delta sub-template configurations are recursively installed until the systems reaches the same configuration as the source. An audit can be performed to ensure the migration process has occurred without errors.

Figure 7:
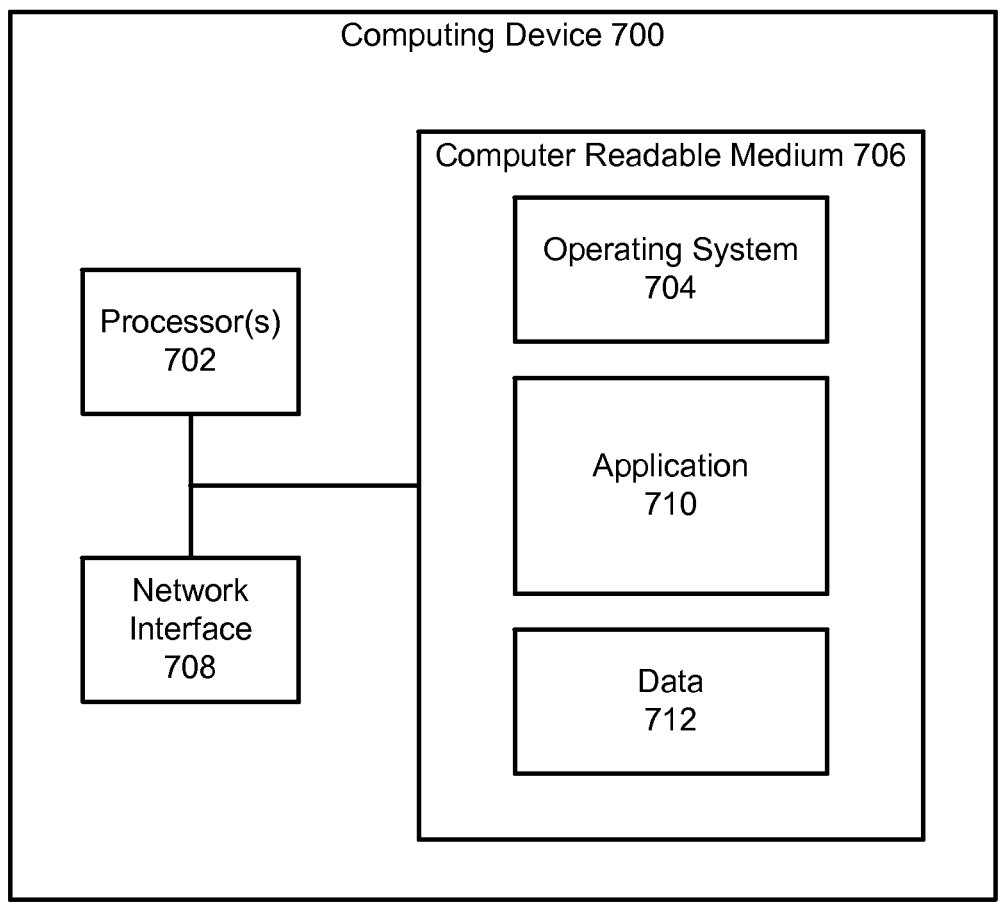
FIG. 7 is a diagram of an example computing device configured for dynamic template functionality in accordance with at least one implementation.

FIG. 7 is a diagram of an example computing device 700 in accordance with at least one implementation. The computing device 700 includes one or more processors 702, nontransitory computer readable medium 706 and network interface 708. The computer readable medium 706 can include an operating system 704, a dynamic template application 710 and a data section 712 (e.g., for storing dynamic template data).

In operation, the processor 702 may execute the application 710 stored in the computer readable medium 706. The application 710 can include software instructions that, when executed by the processor, cause the processor to perform operations for dynamic templates in accordance with the present disclosure (e.g., performing one or more of 402-420 and/or 502-528 described above).

The application program 710 can operate in conjunction with the data section 712 and the operating system 704.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for dynamic templates for virtualized systems.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method to deploy a virtualized system, the method comprising:
   receiving a selection of one or more sub-levels within a displayed hierarchy of a dynamic template, each sub-level corresponding to a specific configuration of a given virtual element associated with that sub-level, the selection indicating the dynamic template having base configuration information of a base configuration corresponding to a virtual machine configuration and one or more sub-level configurations each corresponding to a respective virtual application for execution on a virtual machine, the base configuration and the one or more sublevel configurations arranged in the hierarchy, the one or more sub-level configurations each having corresponding sub-level configuration information;
   in response to the selection of the one or more sub-levels within the displayed hierarchy of the dynamic template:
      traversing the hierarchy within the selected one or more sub-levels to identify additional sub-level configurations located below the selected one or more sub-levels within the hierarchy; and
      installing the identified additional sub-level configurations according to the hierarchy.

2. The method of claim 1, further comprising authenticating a user according to a Role Based Access Control (RBAC) policy configured to permit the user to access a subset of the dynamic template to perform one or more operations corresponding to permissions established within the RBAC for the user.

3. The method of claim 1, wherein the virtual machine includes virtual hardware.

4. The method of claim 1, further comprising installing a base configuration by deploying a clone of the virtualized system at a second virtualized system.

5. The method of claim 1, further comprising generating a fingerprint corresponding to the selection, the fingerprint indicating the dynamic template and one or more locations within the dynamic template corresponding to the one or more sub-levels.

6. The method of claim 5, wherein the dynamic template and the one or more locations within the dynamic template are processed to generate an incremental fingerprint.

7. The method of claim 5, wherein the fingerprint is an incremental fingerprint including one or more portions corresponding to one or more changes to the dynamic template.

8. The method of claim 7, further comprising determining the dynamic template and the one or more locations in the dynamic template based on the incremental fingerprint.

9. A system comprising:
   one or more processors coupled to a nontransitory computer readable medium having stored thereon on software instructions that, when executed by the one or more processors, cause the one or more processors to:
      receive a selection indicating a dynamic template;
      install a base configuration using base configuration information obtained from the dynamic template, the base configuration corresponding to a virtual machine configuration;
      generate a fingerprint corresponding to the dynamic template selection indicating the dynamic template and one or more locations within the dynamic template wherein the fingerprint is usable to recreate the dynamic template;

traverse the hierarchy within the dynamic template and install one or more sub-level configurations according to the hierarchy, each of the one or more sub-level configurations corresponding to a respective virtual application for execution on a virtual machine, the one or more sub-level configurations each having corresponding sub-level configuration information;

determine that a termination condition is reached; and in response to the determination, stop the traversal and installation of the one or more sub-level configurations according to the hierarchy.

10. The system of claim 9, wherein the fingerprint enables traversal of the hierarchy and wherein addition to the fingerprint enables arrival at a predictable fingerprint.

11. The system of claim 10, wherein the fingerprint is an incremental fingerprint including one or more portions corresponding to one or more changes to the dynamic template.

12. The system of claim 11, wherein the software instructions are further configured to cause the one or more processors to determine the dynamic template and the one or more locations in the dynamic template based on the incremental fingerprint.

13. A nontransitory computer readable medium having stored thereon software instructions that, when executed by one or more processors, cause the one or more processors to:

receive a dynamic template selection with a selected dynamic template, wherein the selection includes an indication of one or more locations within the dynamic template, each location corresponding to a specific configuration of a given virtual element associated with that location;

determine whether the dynamic template is valid, wherein the dynamic template is invalid if the dynamic template includes configuration information for at least one of an application, a virtual machine, and virtual hardware, that is not available on a target system;

if it is determined that the dynamic template is valid,
install a base configuration using base configuration information obtained from the dynamic template on the target system;

traverse a hierarchy within the dynamic template and install one or more sub-level configurations on the target system according to the hierarchy, wherein two or more virtual elements are created that correspond to a same location of the one or more locations in the hierarchy and wherein each of the two or more virtual elements have a same fingerprint;

determine that a termination condition is reached; and in response to the determination, stop the traversal and installation of the one or more sub-level configurations according to the hierarchy; and if it is determined that the dynamic template is not valid, report an error.

14. The nontransitory computer readable medium of claim 13, wherein the software instructions are further configured to cause the one or more processors to authenticate a user according to a Role Based Access Control (RBAC) policy configured to permit the user to access a subset of the dynamic template perform operations corresponding to permissions established within the RBAC for the user.

15. The nontransitory computer readable medium of claim 13, wherein the software instructions are further configured to cause the one or more processors to generate a fingerprint corresponding to the selection indicating the dynamic template and the one or more locations within the dynamic template.

16. The nontransitory computer readable medium of claim 15, wherein the fingerprint changes when a change is applied to a virtual element that corresponds to the fingerprint.

17. The nontransitory computer readable medium of claim 15, wherein the fingerprint is usable to recognize virtual machines from the installed one or more sub-level configurations that have a nearest fingerprint to a given virtual machine.

18. The nontransitory computer readable medium of claim 15, with further instructions stored thereon that cause the one or more processors to generate a fingerprint corresponding to the dynamic template selection indicating the dynamic template and the one or more locations within.

19. The nontransitory computer readable medium of claim 15, wherein the fingerprint is an incremental fingerprint including one or more portions corresponding to one or more changes to the dynamic template.

20. The nontransitory computer readable medium of claim 19, wherein the incremental fingerprint is processed to determine a dynamic template and one or more locations in the dynamic template.

* * * * *